(12) United States Patent
Kim et al.

(10) Patent No.: US 11,043,669 B2
(45) Date of Patent: Jun. 22, 2021

(54) ELECTRODE AND SECONDARY BATTERY COMPRISING THE SAME

(71) Applicant: LG Chem, Ltd., Seoul (KR)

(72) Inventors: Nam Won Kim, Daejeon (KR); Pil Kyu Park, Daejeon (KR); Han Gab Song, Daejeon (KR); An Soo Jeong, Daejeon (KR)

(73) Assignee: LG Chem, Ltd.

( * ) Notice: Subject to any disclaimer, the term of this patent is extended or adjusted under 35 U.S.C. 154(b) by 103 days.

(21) Appl. No.: 16/344,659

(22) PCT Filed: Jun. 1, 2018

(86) PCT No.: PCT/KR2018/006325
§ 371 (c)(1),
(2) Date: Apr. 24, 2019

(87) PCT Pub. No.: WO2018/225994
PCT Pub. Date: Dec. 13, 2018

(65) Prior Publication Data
US 2020/0058962 A1    Feb. 20, 2020

(30) Foreign Application Priority Data

Jun. 9, 2017   (KR) .................. 10-2017-0072588
May 31, 2018   (KR) .................. 10-2018-0062420

(51) Int. Cl.
*H01M 4/36* (2006.01)
*H01M 10/0587* (2010.01)
(Continued)

(52) U.S. Cl.
CPC ....... *H01M 4/366* (2013.01); *H01M 10/0431* (2013.01); *H01M 10/0587* (2013.01);
(Continued)

(58) Field of Classification Search
CPC ........ H01M 2/26; H01M 2/263; H01M 4/366; H01M 10/0431; H01M 10/0587;
(Continued)

(56) References Cited

U.S. PATENT DOCUMENTS

2005/0003264 A1 *   1/2005   Oh .................... H01M 10/0587
                                                         429/94
2007/0059590 A1      3/2007   Hayashi et al.
(Continued)

FOREIGN PATENT DOCUMENTS

DE   102011004932 A1   9/2012
JP      H9180704 A     7/1997
(Continued)

OTHER PUBLICATIONS

Extended European Search Report with written opinion for Application No. 18813454.8 dated Nov. 28, 2019, 8 pages.
(Continued)

*Primary Examiner* — Gregg Cantelmo
(74) *Attorney, Agent, or Firm* — Lerner, David, Littenberg, Krumholz & Mentlik, LLP (57) ABSTRACT

The present invention relates to a secondary battery. The secondary battery comprises an electrode assembly in which an electrode and a separator are alternately stacked and wound, wherein the electrode comprises a collector, a first coating layer in which an electrode active material is applied to a surface of the collector, and a second coating layer in which the electrode active material is applied to the outside of the first coating layer, wherein an end of the second coating layer has a length less than an end of first coating layer in a winding direction of the electrode, and a stepped portion occurs between the end of the first coating layer and the end of the second coating layer in a direction outward from a winding center.

7 Claims, 7 Drawing Sheets

(51) Int. Cl.
*H01M 10/04* (2006.01)
*H01M 50/531* (2021.01)
*H01M 50/538* (2021.01)
*H01M 4/02* (2006.01)

(52) U.S. Cl.
CPC ....... *H01M 50/531* (2021.01); *H01M 50/538* (2021.01); *H01M 2004/025* (2013.01); *Y02E 60/10* (2013.01)

(58) Field of Classification Search
CPC ........ H01M 4/13; H01M 4/24; H01M 50/531; H01M 50/538
See application file for complete search history.

(56) References Cited

U.S. PATENT DOCUMENTS

| | | | |
|---|---|---|---|
| 2008/0026293 | A1 | 1/2008 | Marple et al. |
| 2008/0050653 | A1* | 2/2008 | Berkowitz ............ H01M 4/581 429/221 |
| 2012/0107654 | A1 | 5/2012 | Bhardwaj et al. |
| 2012/0196167 | A1 | 8/2012 | Kim et al. |
| 2013/0029212 | A1 | 1/2013 | Hong |
| 2013/0045405 | A1 | 2/2013 | Ahn |
| 2013/0224584 | A1 | 8/2013 | Sung et al. |
| 2014/0120395 | A1 | 5/2014 | Ziegler |
| 2016/0072149 | A1 | 3/2016 | Huang |

FOREIGN PATENT DOCUMENTS

| | | |
|---|---|---|
| JP | H1092418 A | 4/1998 |
| JP | H11214035 A | 8/1999 |
| JP | 2000021453 A | 1/2000 |
| JP | 2000067907 A | 3/2000 |
| JP | 2005174791 A | 6/2005 |
| JP | 2011138729 A | 7/2011 |
| JP | 2015125832 A | 7/2015 |
| JP | 2016514354 A | 5/2016 |
| JP | 2016122628 A | 7/2016 |
| JP | 2016207576 A | 12/2016 |
| KR | 100014371 B | 2/1983 |
| KR | 1019970018808 A | 4/1997 |
| KR | 100790852 B1 | 1/2008 |
| KR | 20090035704 A | 4/2009 |
| KR | 101103499 B1 | 1/2012 |
| KR | 101163391 B1 | 7/2012 |
| KR | 20120124077 A | 11/2012 |
| KR | 20130014371 A | 2/2013 |
| KR | 20130020550 A | 2/2013 |
| KR | 20150028663 A | 3/2015 |
| KR | 20150049519 A | 5/2015 |
| KR | 101736545 B1 | 5/2017 |
| WO | 2011080901 A1 | 7/2011 |
| WO | 2012060972 A1 | 5/2012 |
| WO | 2012117005 A1 | 9/2012 |

OTHER PUBLICATIONS

International Search Report for Appln No. PCT/EP2012/053395, dated Jun. 5, 2012, 6 pages.
International Search Report for PCT/KR2018/006325 dated Sep. 3, 2018.

* cited by examiner

---- STEPPED PORTION

ELECTRODE AND SECONDARY BATTERY COMPRISING THE SAME

CROSS-REFERENCE TO RELATED APPLICATION

The present application is a national phase entry under 35 U.S.C. § 371 of International Patent Application No. PCT/KR2018/006325, filed on Jun. 1, 2018, published in Korean, which claims priority from Korean Patent Application Nos. 10-2017-0072588, filed on Jun. 9, 2017, and 10-2018-0062420, filed on May 31, 2018, the disclosures of which are hereby incorporated by reference herein in their entireties.

TECHNICAL FIELD

The present invention relates to an electrode and a secondary battery comprising the same, and more particularly, to an electrode, in which cracks are prevented from occurring in the electrode wound around a core part, and a secondary battery comprising the same.

BACKGROUND ART

In general, secondary batteries refer to chargeable and dischargeable batteries, unlike primary batteries that are not chargeable. The secondary batteries are being widely used in the fields of small and advanced electronic devices such as mobile phones, PDAs, and notebook computers.

Such a secondary battery comprises an electrode assembly, a core part inserted into a core of the electrode assembly, a can accommodating the electrode assembly into which the core part is inserted, and a cap assembly mounted on an opening of the can. The electrode assembly has a structure in which a plurality of electrodes and a plurality of separators are alternately stacked. Also, each of the plurality of electrodes comprises an electrode active material layer coated with an electrode active material on a surface thereof and a non-coating portion disposed on an end of the electrode active material layer without coated with the electrode active material.

As described above, in the secondary battery, a stack in which the plurality of electrodes and the plurality of separators are stacked may be wound around the core part to form the electrode assembly. Then, the electrode assembly may be inserted into the can, and the cap assembly may be coupled to the opening of the can.

However, in the plurality of electrodes, when wound around the core part, a stepped portion between the electrode active material layer and the non-coating potion may be folded to cause cracks.

DISCLOSURE OF THE INVENTION

Technical Problem

The present invention has been made in order to solve the above problem, and thus an object of the present invention is to provide an electrode, which gradually increases in height of a stepped portion between an electrode active material layer and a non-coating portion to stably wind the electrode without an occurrence of folding of the stepped portion between the electrode active material layer and the non-coating portion when the electrode is wound around the core part, thereby preventing the cracks from occurring, and a secondary battery comprising the same.

Technical Solution

To achieve the above object, a secondary battery according to a first invention comprises an electrode assembly in which an electrode and a separator are alternately stacked and wound,
wherein the electrode comprises a collector, a first coating layer of electrode active material applied to a surface of the collector, and a second coating layer of electrode active material applied to an outside surface of the first coating layer, and wherein the first coating layer has a first length in a winding direction of the electrode, and the second coating layer has a second length in the winding direction less than the first length, such that a stepped pattern occurs between a proximal end of the first coating layer and a proximal end of the second coating layer.

The collector may have a first non-coating portion on which the electrode active material of the first coating layer is not provided, and a proximal end of the first non-coating portion, the proximal end of the first coating layer, and the proximal end of the second coating layer may form a stepped stair pattern.

The secondary battery may further comprise a core part for winding the electrode assembly, wherein a difference between the first length and the second length is equal to or greater than a circumferential length of the core part.

A stepped pattern may occur between a distal end of the first coating layer and a distal end of the second coating layer.

The collector may have a second non-coating portion on which the electrode active material of the first coating layer is not provided, and a distal end of the second non-coating portion, the distal end of the first coating layer, and the distal end of the second coating layer may form a stepped stair pattern.

The first coating layer and the second coating layer may each have a same thickness.

The first coating layer and the second coating layer may have respective first and second different thicknesses.

The electrode may further comprise a third coating layer of electrode active material applied to an outside surface of the second coating layer and a fourth coating layer of electrode active material applied to an outside surface of the third coating layer.

The third coating layer may have a third length in the winding direction less than the second length, and the fourth coating layer may have a fourth length in the winding direction less than the third length, and the third and fourth coating layers have proximal third and fourth ends, respectively, such that a stepped pattern occurs between the proximal ends of the first, second, third, and fourth coating layers.

An electrode tab may be disposed on the first non-coating portion.

The electrode tab may be disposed on the first non-coating portion contacting the proximal end of the first coating layer within the stepped pattern.

An electrode according to a second invention comprises: a collector; a first coating layer of electrode active material applied to a surface of the collector; and a second coating layer of electrode active material applied to an outside surface of the first coating layer, wherein the first coating layer has a first length in a winding direction of the electrode, and the second coating layer has a second length in the winding direction less than the first length, such that a stepped pattern occurs between a proximal end of the first coating layer and a proximal end of the second coating layer.

The collector may have a first non-coating portion on which the electrode active material of the first coating layer is not provided, and a proximal end of the first non-coating portion, the proximal end of the first coating layer, and the proximal end of the second coating layer form a stepped stair pattern.

An electrode tab may be disposed on the first non-coating portion, and the electrode tab may be disposed on the first non-coating portion contacting the proximal end of the first coating layer within the stepped pattern.

Advantageous Effects

The present invention according to the foregoing embodiments has effects as follows.

First: in the secondary battery of the present invention, the first and second coating layers may be formed on the surface of the collector to form the electrode. Here, the stepped portion may be formed between the one end of the first coating layer and the second coating layer. Therefore, the electrode may be stably wound around the core part without being folded to improve the productivity.

Second: in the secondary battery of the present invention, the electrode comprises the first non-coating portion at the winding start portion. As a result, the stepped portion connected to the first non-coating portion, the first coating layer, and the second coating layer may be formed to realize the more gentle inclination angle, thereby more stably winding the electrode around the core part.

Third: the electrode of the present invention may be formed with the length as small as the circumferential length of the core part between the end of the first coating layer and the end of the second coating layer. Therefore, the electrode may be stably wound around the core part, and also, the battery performance may be stably secured.

Fourth: in the electrode of the present invention, the ends of the first coating layer and the second coating layer, which are disposed on the winding distal end, may be stepped to realize the gentile inclination angle. Therefore, the end of the electrode may more come into surface contact with the core to improve the electrode winding force and bonding force.

Fifth: the electrode of the present invention may comprise the non-coating portion on the winding distal end. Therefore, the stepped portion connected to the end of the second coating layer, the end of the first coating layer, and the second non-coating portion may be formed to realize the more gentle inclination angle, thereby more stably winding the end of the electrode around the core part.

Sixth: in the electrode of the present invention, the first coating layer and the second coating layer may have the same thickness. Therefore, the stepped portion may gradually increase in height, and thus, the first coating layer and the second coating layer may be stably wound without being folded therebetween.

Seventh: in the secondary battery of the present invention, the electrode tab may be coupled to the first non-coating portion. Here, the electrode tab may be coupled to the surface of the first non-coating portion to which the end of the first coating layer is connected. Therefore, the stepped portion between the electrode tab and the first coating layer may be removed, and thus, when the electrode is wound around the core part, the electrode tab and the first coating layer may be stably wound without being folded therebetween.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery of First Invention

First Embodiment of the First Invention

Figure 1:
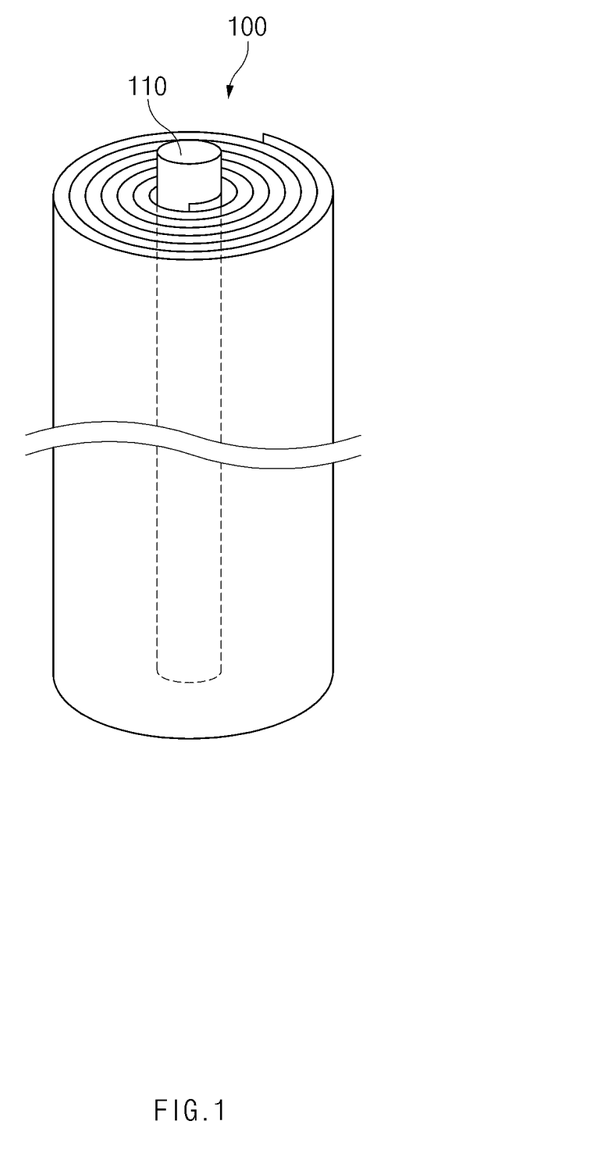
FIG. 1 is a perspective view of a secondary battery according to a first embodiment of a first invention.

As illustrated in FIG. 1, a secondary battery 100 according to a first embodiment of a first invention comprises a core part 110 and an electrode assembly 120 wound around the core part 110. Here, when the winding of the electrode assembly 120 is completed, the core part 110 may be removed from the electrode assembly 120.

Figure 2:
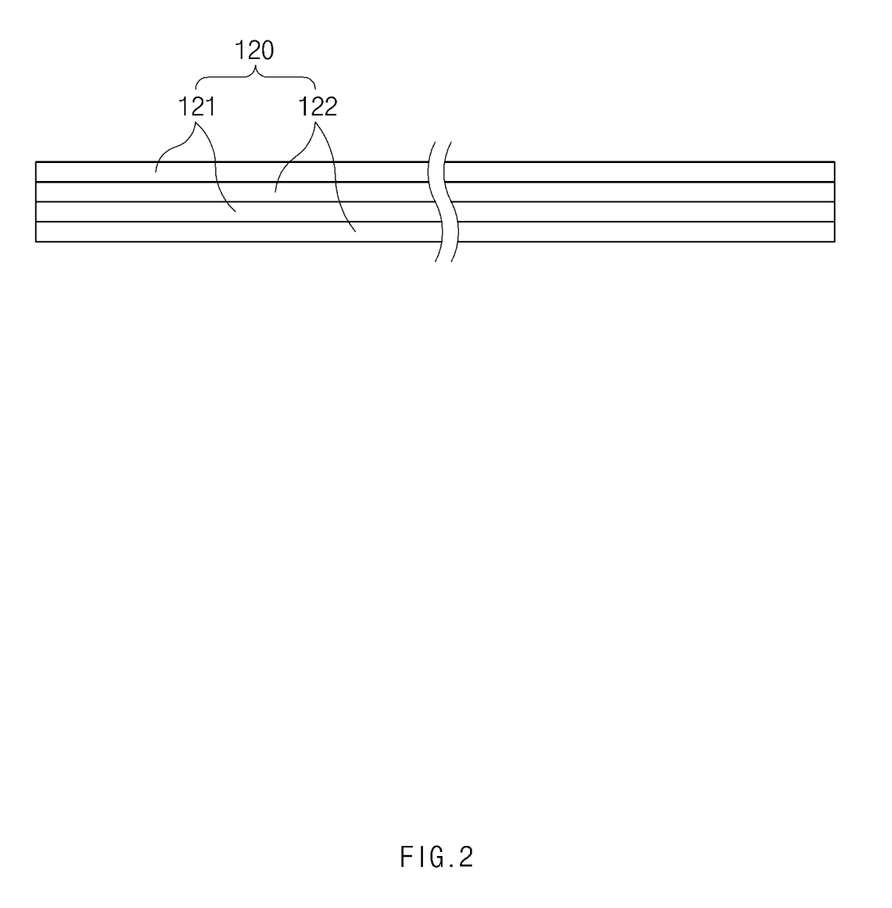
FIG. 2 is a cross-sectional view of an electrode assembly before being wound according to the first embodiment of the first invention.

That is, as illustrated in FIG. 2, in the secondary battery 100 according to the first embodiment of the first invention, the electrode assembly 120 having a long sheet shape may be wound around the core part 110 in the form of a roll to form the electrode assembly 120, and the electrode assembly 120 may have a structure in which an electrode 121 and a separator 122 are alternately stacked.

Figure 3:
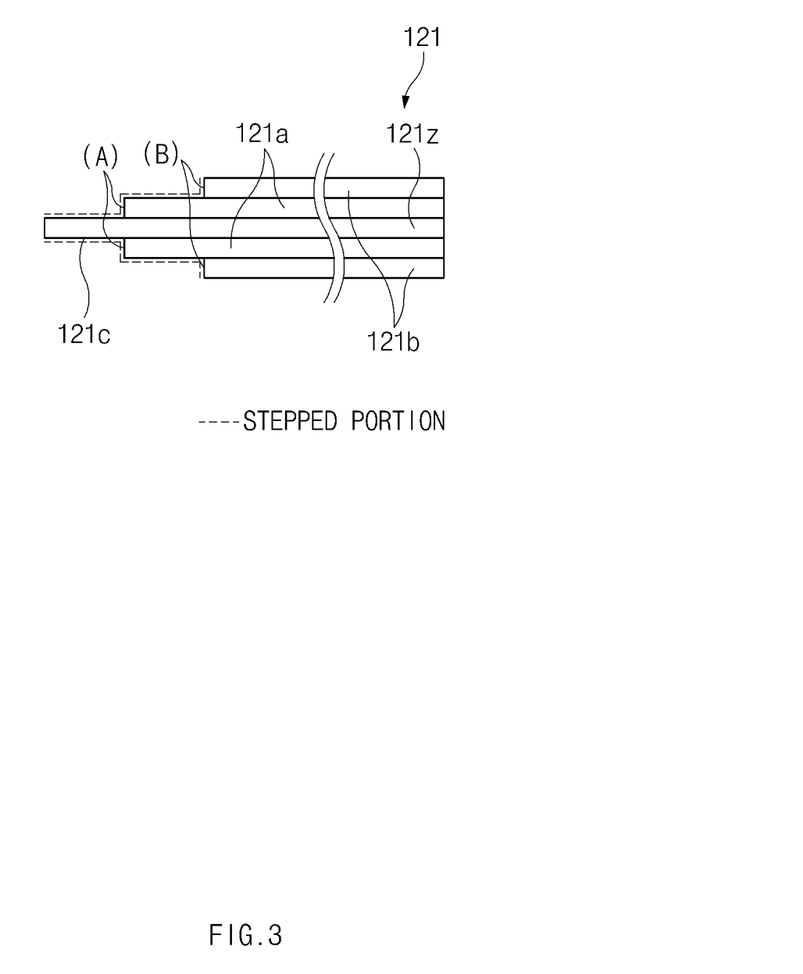
FIG. 3 is a cross-sectional view of an electrode according to the first embodiment of the first invention.

As illustrated in FIG. 3, the electrode 121 comprises a collector 121z, a first coating layer 121a in which an electrode active material is primarily applied to a surface of the collector 121z, and a second coating layer 121b in which the electrode active material is secondarily applied to the outside of the first coating layer 121a.

Here, referring to FIG. 3, an end B of the second coating layer 121b has a length less than that of an end A of the first coating layer with respect to a winding direction of the electrode 121. Thus, a stepped portion (see a dotted line displayed in FIG. 3) is formed between the end A of the first coating layer 121a and the end B of the second coating layer 121b in a direction from a winding center to the outside.

That is, in the electrode 121, the stepped portion (see the dotted line displayed in FIG. 3) may be formed between the end A of the first coating layer 121a and the end B of the second coating layer 121b to realize a gentle inclination. The end A of the first coating layer 121a and the end B of the second coating layer 121b, which are gently inclined, may be sequentially wound around the core part 110 and thus stably wound without being folded to improve productivity of the secondary battery.

A first non-coating portion 121c that is not coated with the electrode active material may be disposed on the winding start portion of the electrode 121 that is closely attached to the core part 110.

That is, in the electrode 121, when viewed in FIG. 3, a left end of the collector 121z may extend to form the first non-coating portion 121c. Thus, the first non-coating portion 121c, the end A of the first coating layer 121a, and the end B of the second coating layer 121b may form a stepped portion (see the dotted line displayed in FIG. 3) that gradually increases in height.

Thus, in the electrode 121, the first non-coating portion 121c, the end A of the first coating layer 121a, and the end B of the second coating layer 121b may be sequentially wound to realize stable winding force and prevent cracks from occurring.

In the electrode 121, the end B of the second coating layer 121b may have a length as small as a circumferential length of the core part 110 at the end A of the first coating layer 121a, preferably, the same length as the circumferential length of the core part 110. That is, although the length between the end B of the second coating layer 121b and the end A of the first coating layer 121a is less than the circumferential length of the core part 110, the electrode 121 may be wound without the occurrence of the cracks due to the stair-shaped stepped portion between the end B of the second coating layer 121b and the end A of the first coating layer 121a. However, the core part 110 may not be stably closely attached between the end B of the second coating layer 121b and the end A of the first coating layer 121a.

Also, when the length between the end B of the second coating layer 121b and the end A of the first coating layer 121a is greater than the circumferential length of the core part 110, an amount of electrode active material applied to the electrode 121 may be significantly reduced to deteriorate the battery performance.

Thus, in the electrode 121, the length between the end B of the second coating layer 121b and the end A of the first coating layer 121a may be the same length as the circumferential length of the core part 110 to improve the winding force and the battery performance.

Also, the first coating layer 121a and the second coating layer 121b have the same coating thickness. Thus, the stepped portion may have the uniform height to reduce the more stable winding.

Alternatively, the first coating layer 121a and the second coating layer 121b may have coating thicknesses different from each other. Here, the coating thicknesses of the first coating layer 121a and the second coating layer 121b may be adjusted according to the shape and size of the secondary battery to achieve the stable winding force.

In the secondary battery 100 having the above-described configuration according to the first embodiment of the first invention, the electrode assembly 120 having the long sheet shape and comprising the electrode 121 is wound around the core part 110, the core part 110 may be stably wound due to the stair-shaped stepped portion on the end of the electrode 121. Thus, it may prevent the electrode 121 from being folded or prevent the cracks from occurring.

Hereinafter, in descriptions of another embodiment of the present invention, constituents having the same configuration and function as the abovementioned embodiment have been given the same reference numeral in the drawings, and thus duplicated description will be omitted.

Second Embodiment of the First Invention

Figure 4:
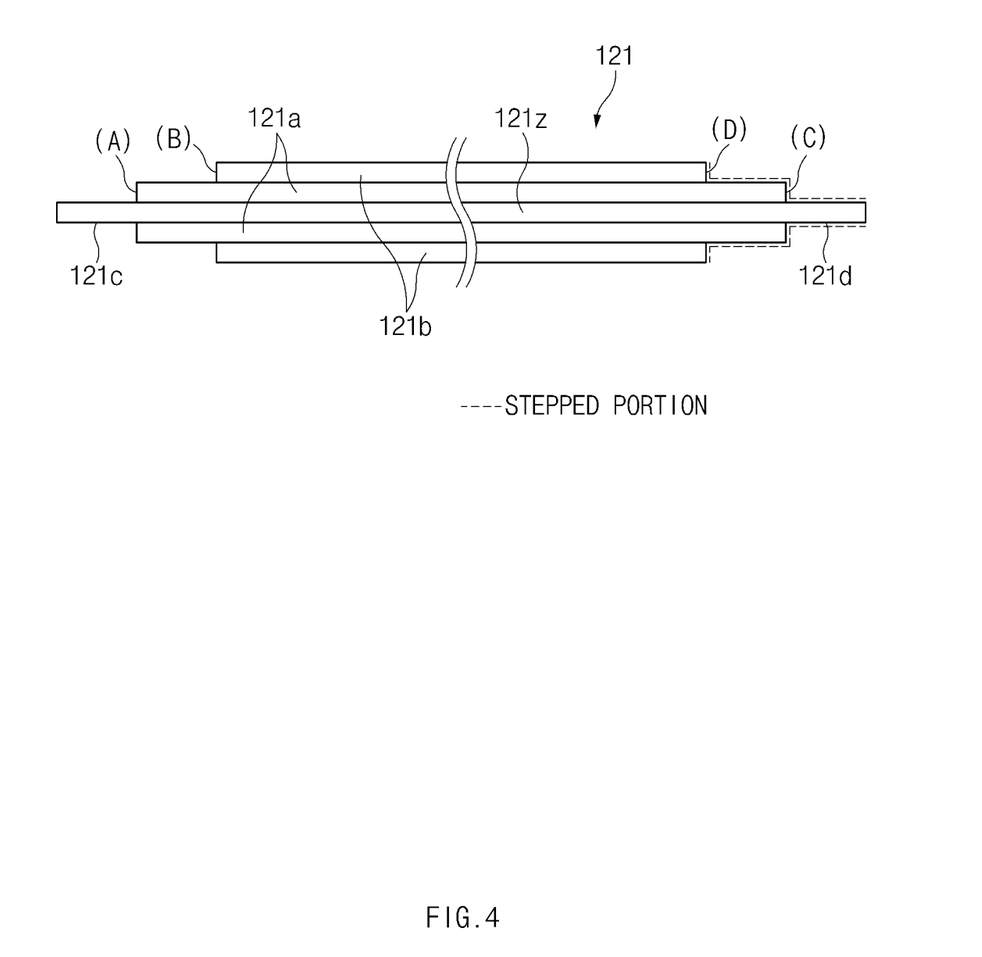
FIG. 4 is a cross-sectional view of an electrode according to a second embodiment of the first invention.

As illustrated in FIG. 4, a secondary battery 100 according to the second embodiment of the first invention comprises an electrode 121. Here, the electrode 121 comprises a collector 121z, a first coating layer 121a in which an electrode active material is primarily applied to a surface of the collector 121z, and a second coating layer 121b in which the electrode active material is secondarily applied to the outside of the first coating layer 121a.

Here, referring to FIG. 4, in the electrode 121, a distal end D of the second coating layer 121b applied to a winding end portion has a length less than that of a distal end C of the first coating layer 121a to form a stepped portion (see a dotted line displayed in FIG. 4) between the distal end D of the second coating layer 121b and the distal end C of the first coating layer 121a.

That is, in the electrode 121, the stepped portion (see the dotted line displayed in FIG. 4) may be formed between the distal end C of the first coating layer and the distal end D of the second coating layer 121b to realize a gentle inclination. That is to say, the distal end D of the second coating layer 121b has a length less than that of the distal end C of the first coating layer 121a and a height greater than that of the distal end C of the first coating layer 121a to realize the gentle inclination. Thus, the distal end C of the first coating layer 121a and the distal end D of the second coating layer 121b may be stably wound while sequentially wound around the outermost side of the electrode assembly 110. Thus, the folding of the electrode 121 or the occurrence of the cracks may be prevented to improve the quality of the secondary battery.

The electrode 121 comprises a second non-coating portion 121d in which an electrode active material is not applied to a winding end portion (a right end of a collector when viewed in FIG. 4). The second non-coating portion 121d, the distal end C of the first coating layer 121a, and the distal end D of the second coating layer 121b may be stepped in the form of a stair.

That is, the second non-coating portion 121d, the distal end C of the first coating layer 121a, and the distal end D of the second coating layer 121b may be stepped in the form a stair that gradually increases in height.

Thus, in the electrode 121, the second non-coating portion 121d, the distal end C of the first coating layer 121a and the distal end D of the second coating layer 121b may be sequentially wound around the core part 110 to realize stable winding force and prevent cracks from occurring.

Third Embodiment of the First Invention

Figure 5:
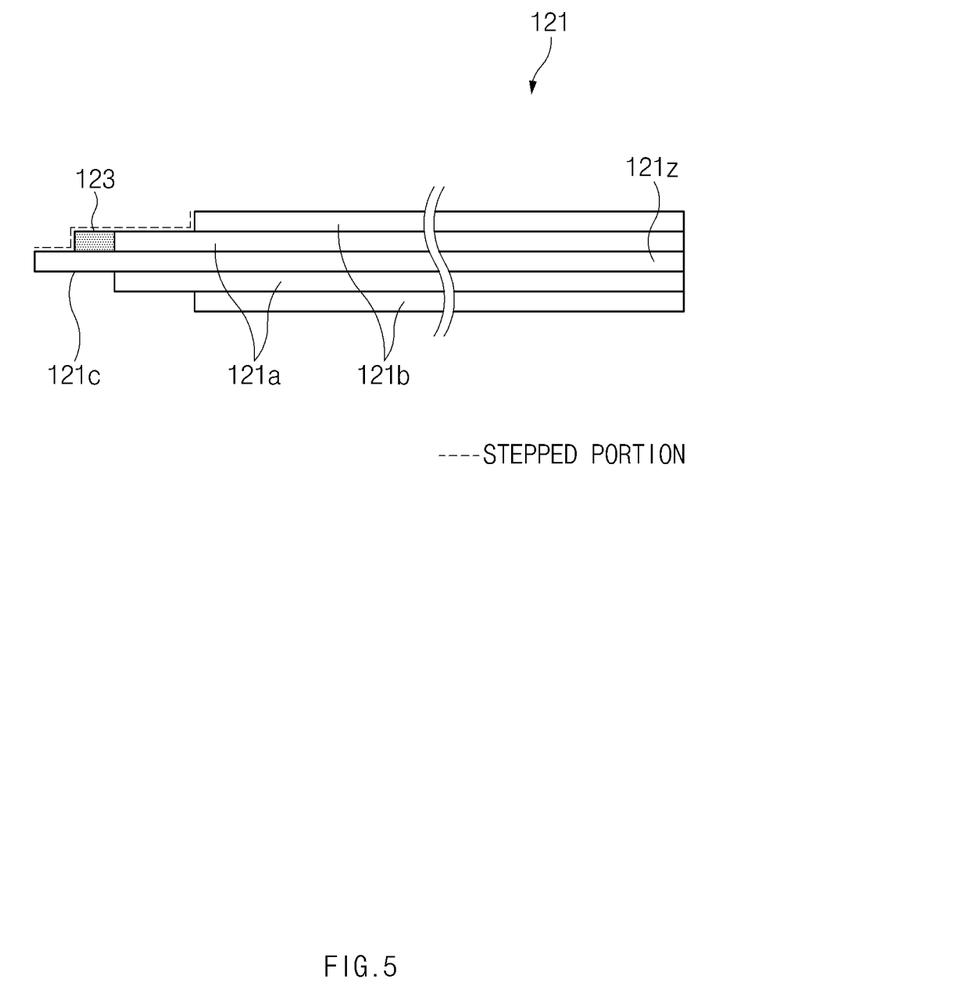
FIG. 5 is a cross-sectional view of an electrode according to a third embodiment of the first invention.

As illustrated in FIG. 5, in a secondary battery 100 according to the third embodiment of the first invention, an electrode tab 123 may be disposed on a first non-coating portion 121c disposed on an electrode 121. Particularly, the electrode tab 123 may be disposed on the first non-coating portion 121c contacting an end A of the first coating layer 121a. Thus, a gap and a stepped portion between the electrode tab 123 and the first coating layer 121*a* may be removed so that the electrode 121 is stably wound.

Here, the electrode tab 123 and the first coating layer 121*a* may have the same thickness. Thus, the stepped portion between the electrode tab 123 and the first coating layer 121*a* may be completely removed, and thus, the electrode 121 may be stably wound.

Fourth Embodiment of the First Invention

Figure 6:
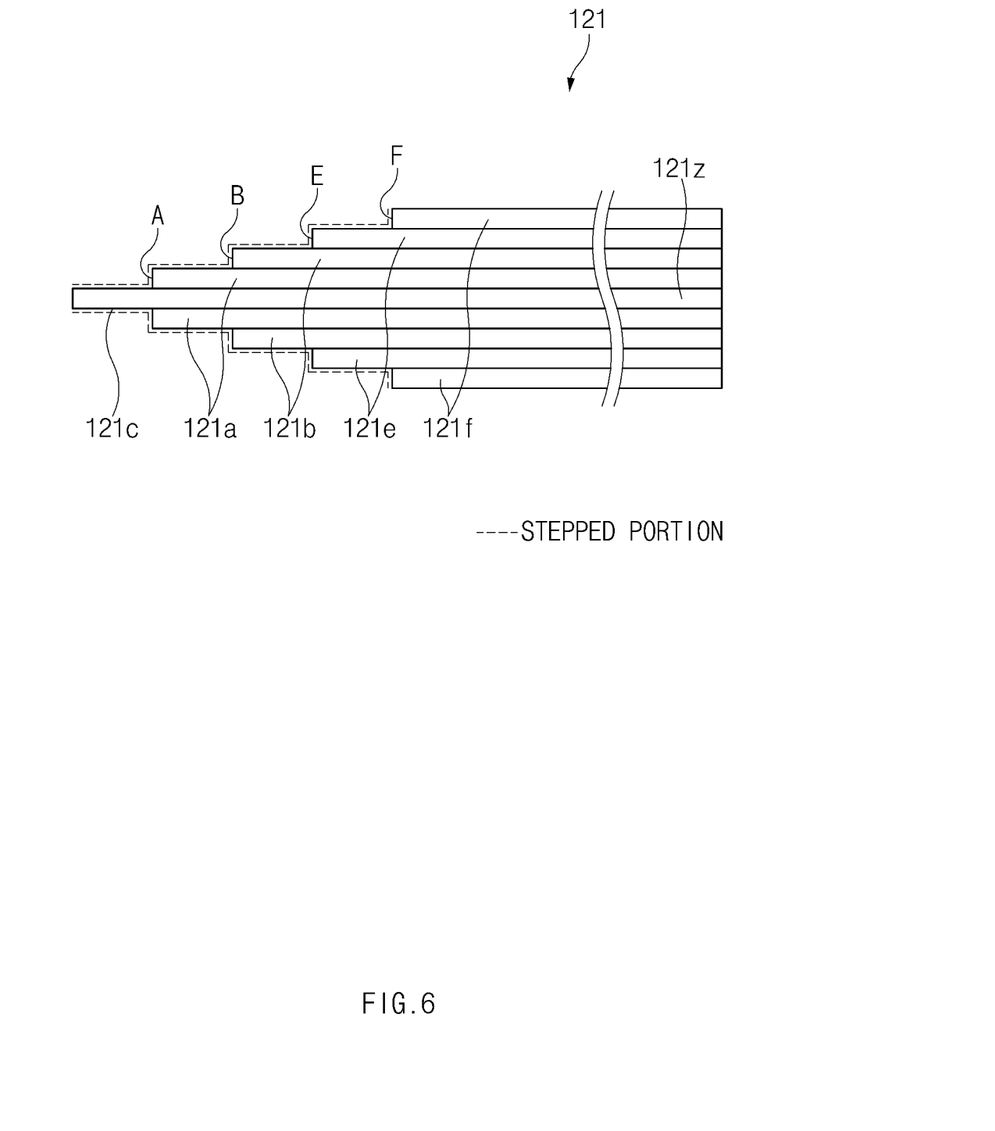
FIG. 6 is a cross-sectional view of an electrode according to a fourth embodiment of the first invention.

As illustrated in FIG. 6, a secondary battery 100 according to the fourth embodiment of the first invention may comprise an electrode 121. The electrode 121 may comprise a collector 121*z*, a first coating layer 121*a* in which an electrode active material is primarily applied to a surface of the collector 121*z*, a second coating layer 121*b* in which the electrode active material is secondarily applied to the outside of the first coating layer 121*a*, a third coating layer 121*e* in which the electrode active material is tertiarily applied to the outside of the second coating layer 121*b*, and a fourth coating layer 121*f* in which the electrode active material is quarternarily applied to the outside of the third coating layer 121*e*.

Here, in the electrode 121, an end B of the second coating layer 121*b* may have a length less than an end A of the first coating layer 121*a* in a winding direction of the electrode 121, an end E of the third coating layer 121*e* may have a length less than the end B of the second coating layer 121*b*, and an end F of the fourth coating layer may have a length less than the end E of the third coating layer 121*e*. Thus, the ends of the first, second, third, and fourth coating layers may be stepped in the form of a stair (see a dotted line displayed in FIG. 6).

Therefore, the electrode 121 may have the stepped portion in which the ends of the first, second, third, and fourth coating layers are gently inclined and sequentially wound around a core part 110 to achieve stable winding force.

Electrode of Second Invention

Figure 7:
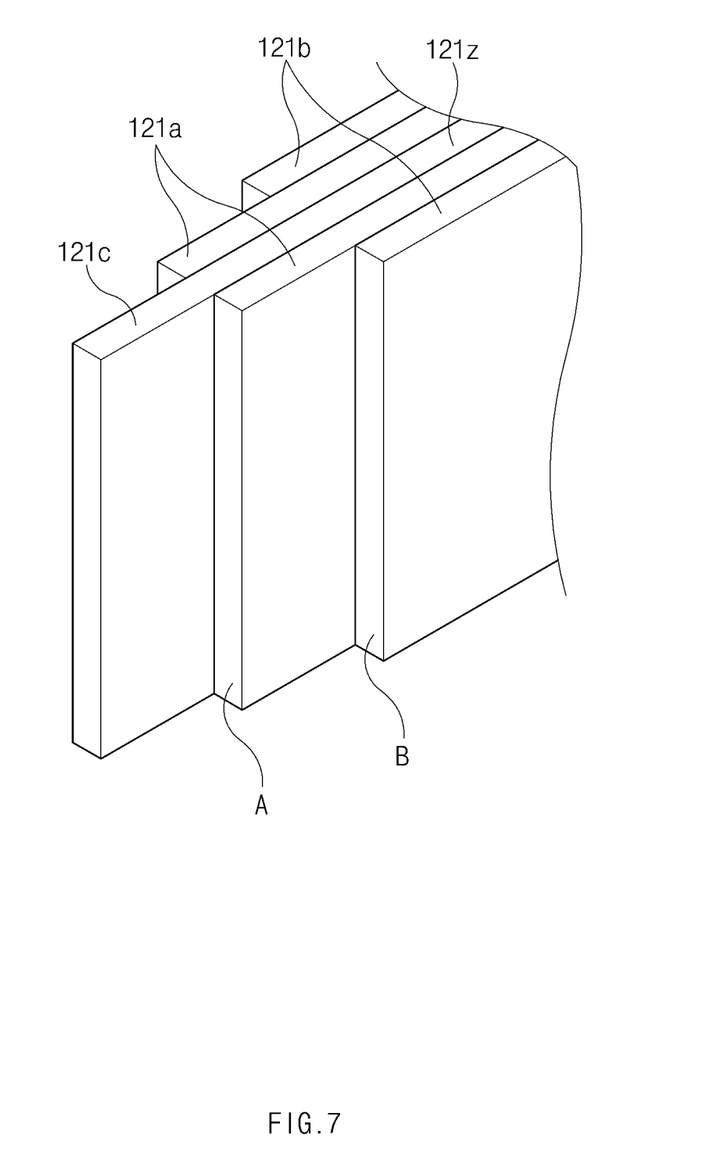
FIG. 7 is a perspective view of an electrode according to a second invention.

As illustrated in FIG. 7, an electrode 121 according to the second invention comprises a collector 121*z*, a first coating layer 121*a* in which an electrode active material is primarily applied to a surface of the collector 121*z* and a second coating layer 121*b* in which the electrode active material is secondarily applied to the outside of the first coating layer. Here, an end B of the second coating layer 121*b* has a length less than an end A of first coating layer 121*a* in a winding direction of the electrode 121, and a stepped portion occurs between the end A of the first coating layer 121*a* and the end B of the second coating layer 121*b* in a direction outward from a winding center.

As described above, in the electrode 121 of the second invention, the stepped portion may be formed to achieve the stable winding force when the electrode 121 is wound around a core part later.

For reference, a subject of the first embodiment of the first invention is to provide the secondary battery, and the second invention is different from the first invention in that a subject of the second invention is to provide the electrode.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising an electrode assembly in which an electrode and a separator are alternately stacked and wound, an ion-conducting electrolyte, an opposing electrode, and an electrode tab,
    wherein the electrode comprises a collector, a first coating layer of electrode active material applied to a surface of the collector, and a second coating layer of electrode active material applied to an outside surface of the first coating layer,
    wherein the first coating layer has a first length in a winding direction of the electrode, and the second coating layer has a second length in the winding direction less than the first length, such that a stepped pattern occurs between a proximal end of the first coating layer and a proximal end of the second coating layer and a stepped pattern occurs between a distal end of the first coating layer and a distal end of the second coating layer,
    wherein the collector has a first non-coating portion on which the electrode active material of the first coating layer is not provided, and a proximal end of the first non-coating portion, the proximal end of the first coating layer, and the proximal end of the second coating layer form a stepped stair pattern,
    wherein the collector has a second non-coating portion on which the electrode active material of the first coating layer is not provided, and a distal end of the second non-coating portion, the distal end of the first coating layer, and the distal end of the second coating layer form a stepped stair pattern, and
    wherein the electrode tab is disposed on the first non-coating portion contacting the proximal end of the first coating layer within the stepped pattern.

2. The secondary battery of claim 1, further comprising a core part for winding the electrode assembly,
    wherein a difference between the first length and the second length is equal to or greater than a circumferential length of the core part.

3. The secondary battery of claim 1, wherein the first coating layer and the second coating layer each have a same thickness.

4. The secondary battery of claim 1, wherein the first coating layer and the second coating layer have respective first and second different thicknesses.

5. The secondary battery of claim 1, wherein the electrode further comprises a third coating layer of electrode active material applied to an outside surface of the second coating layer and a fourth coating layer of electrode active material applied to an outside surface of the third coating layer.

6. The secondary battery of claim 5, wherein the third coating layer has a third length in the winding direction less than the second length, and the fourth coating layer has a fourth length in the winding direction less than the third length, and the third and fourth coating layers have proximal third and fourth ends, respectively, such that
    a stepped pattern occurs between the proximal ends of the first, second, third, and fourth coating layers.

7. An electrode comprising:
    a collector;
    a first coating layer of electrode active material applied to a surface of the collector; and
    a second coating layer of electrode active material applied to an outside surface of the first coating layer,
    wherein the first coating layer has a first length in a winding direction of the electrode, and the second coating layer has a second length in the winding direction less than the first length, such that a stepped pattern occurs between a proximal end of the first coating layer and a proximal end of the second coating layer and a stepped pattern occurs between a distal end of the first coating layer and a distal end of the second coating layer, wherein the collector has a first non-coating portion on which the electrode active material of the first coating layer is not provided, and a proximal end of the first non-coating portion, the proximal end of the first coating layer, and the proximal end of the second coating layer form a stepped stair pattern, wherein the collector has a second non-coating portion on which the electrode active material of the first coating layer is not provided, and a distal end of the second non-coating portion, the distal end of the first coating layer, and the distal end of the second coating layer form a stepped stair pattern, and wherein an electrode tab is disposed on the first non-coating portion contacting the proximal end of the first coating layer within the stepped pattern.

\* \* \* \* \*